(12) United States Patent
Williams

(10) Patent No.: US 9,569,957 B2
(45) Date of Patent: Feb. 14, 2017

(54) SYSTEMS, DEVICES AND METHODS INVOLVING DEVICE IDENTIFICATION

(75) Inventor: Rodney Owen Williams, Cary, NC (US)

(73) Assignee: HTC CORPORATION, Taoyuan (TW)

(*) Notice: Subject to any disclaimer, the term of this patent is extended or adjusted under 35 U.S.C. 154(b) by 694 days.

(21) Appl. No.: 13/414,777

(22) Filed: Mar. 8, 2012

(65) Prior Publication Data
US 2013/0234839 A1 Sep. 12, 2013

(51) Int. Cl.
| | |
|---|---|
| G05B 19/00 | (2006.01) |
| G08B 23/00 | (2006.01) |
| G08B 21/00 | (2006.01) |
| G08C 19/16 | (2006.01) |
| H04Q 1/30 | (2006.01) |
| H04M 11/04 | (2006.01) |
| G08B 1/08 | (2006.01) |
| G08C 19/04 | (2006.01) |
| H04M 1/04 | (2006.01) |

(52) U.S. Cl.
CPC .............. G08C 19/04 (2013.01); H04M 1/04 (2013.01)

(58) Field of Classification Search
CPC .............. G08C 19/04–19/28; G01R 31/02; H04B 3/546; G06F 1/1632; G06F 1/266; G06F 11/006; G06F 13/4068; G06F 1/26; G06F 2213/0042; H02J 2007/0096; H02J 2007/0001; H02J 2007/006; H02J 2007/0062; H02J 4/00; H02J 7/00; H02J 7/0004; H02J 7/0006; H02J 7/0011; H02J 7/0031; H02J 7/0042; H04M 1/6041; H04M 1/72527; H04M 1/0274; H04M 1/04; G01N 27/00

USPC .............................................. 340/12.1–12.55
See application file for complete search history.

(56) References Cited

U.S. PATENT DOCUMENTS 4,870,863 A * 10/1989 Duncan ................ G01D 18/008
200/56 R
5,469,126 A * 11/1995 Murtojarvi .................... 332/105
(Continued)

FOREIGN PATENT DOCUMENTS

| | | |
|---|---|---|
| DE | 19914004 | 10/2000 |
| TW | 200507602 | 2/2005 |
| TW | 201216070 | 4/2012 |

OTHER PUBLICATIONS

Taiwan Office Action dated Aug. 28, 2014.
(Continued)

*Primary Examiner* — Steven Lim
*Assistant Examiner* — Muhammad Adnan
(74) *Attorney, Agent, or Firm* — McClure, Qualey & Rodack, LLP

(57) ABSTRACT

Systems, devices and methods involving device identification are provided. In this regard, a representative system includes: a first device having a first power line and a first connector, the first connector being coupled to the first power line; and a second device having a second power line and a second connector, the second connector being coupled to the second power line and sized and shaped to mate with the first connector such that the first device electrically communicates with the second device; the first device being operative to modulate impedance exhibited at the first power line; the second device being operative to detect the modulated impedance and correlate the modulated impedance with an identification of the first device.

11 Claims, 7 Drawing Sheets

(56) References Cited

U.S. PATENT DOCUMENTS

| | | | |
|---|---|---|---|
| 5,648,711 A * | 7/1997 | Hakkarainen | 320/107 |
| 5,781,077 A * | 7/1998 | Leitch et al. | 332/117 |
| 5,783,926 A * | 7/1998 | Moon et al. | 320/106 |
| 5,859,522 A * | 1/1999 | Theobald | 320/106 |
| 6,567,007 B1 | 5/2003 | Frittsche et al. | |
| 8,683,090 B2 * | 3/2014 | Mullins et al. | 710/16 |
| 9,319,823 B2 * | 4/2016 | Seo | H04W 4/001 |
| 2002/0175658 A1 * | 11/2002 | Watts | H02J 7/0091 |
| | | | 320/150 |
| 2004/0081099 A1 | 4/2004 | Patterson et al. | |
| 2004/0251878 A1 * | 12/2004 | Veselic | 320/141 |
| 2006/0043937 A1 * | 3/2006 | Patino | H02J 7/0031 |
| | | | 320/150 |
| 2007/0094423 A1 | 4/2007 | Atkinson | |
| 2007/0226497 A1 * | 9/2007 | Taylor | G06F 21/31 |
| | | | 713/168 |
| 2008/0079573 A1 * | 4/2008 | Bloebaum et al. | 340/568.1 |
| 2008/0126592 A1 * | 5/2008 | Townsend | 710/16 |
| 2008/0219117 A1 * | 9/2008 | Lee | G11B 5/455 |
| | | | 369/53.1 |
| 2008/0309313 A1 * | 12/2008 | Farrar et al. | 323/351 |
| 2009/0001929 A1 * | 1/2009 | Posamentier | 320/108 |
| 2009/0108854 A1 * | 4/2009 | Agevik et al. | 324/691 |
| 2010/0081473 A1 * | 4/2010 | Chatterjee et al. | 455/559 |
| 2010/0315210 A1 * | 12/2010 | Travis | G06F 1/266 |
| | | | 340/538 |
| 2011/0167281 A1 * | 7/2011 | Rathi et al. | 713/310 |
| 2012/0058737 A1 * | 3/2012 | Sims et al. | 455/88 |
| 2012/0082246 A1 * | 4/2012 | Su et al. | 375/259 |
| 2012/0096286 A1 | 4/2012 | Huang et al. | |

OTHER PUBLICATIONS

English translation of abstract of TW 200507602 (published Feb. 16, 2005).

German Examination Report dated May 8, 2014.

English translation (by machine) of DE 19914004 (published Oct. 26, 2000).

Office Action received for corresponding China patent application (dated Jun. 2, 2015).

* cited by examiner

SYSTEMS, DEVICES AND METHODS INVOLVING DEVICE IDENTIFICATION

TECHNICAL FIELD

The present disclosure generally relates to electronic devices.

BACKGROUND

Over the years, portable handheld devices and accessories for these devices have become prevalent. Recently, the desire for a device to be able to identify the accessory to which the device is connected has gained in popularity. In this regard, a commonly proposed approach for identifying an accessory is to use a dedicated interface. However, the use of a dedicated interface involves numerous challenges, such as placement considerations and lack of standardization.

SUMMARY

Systems, devices and methods involving device identification are provided. Briefly described, one embodiment, among others, is a system for device identification comprising: a first device having a first power line and a first connector, the first connector being coupled to the first power line; and a second device having a second power line and a second connector, the second connector being coupled to the second power line and sized and shaped to mate with the first connector such that the first device electrically communicates with the second device; the first device being operative to modulate impedance exhibited at the first power line; the second device being operative to detect the modulated impedance and correlate the modulated impedance with an identification of the first device.

Another embodiment is mobile device for use with an accessory, the mobile device comprising: a USB connector; a power line electrically connected to the USB connector; a battery charging circuit electrically connected to the power line, the battery charging circuit being operative to receive power via the power line for charging a battery of the mobile device; and a device detection system capacitively coupled to the power line, the device detector being operative to sense an impedance modulation imposed upon the power line, the impedance modulation being imposed upon the power line by an accessory connected to the USB connector, and correlate the impedance modulation with an identification of the accessory.

Another embodiment is an accessory configured to connect to a mobile device, the accessory comprising: a USB connector; a power line electrically connected to the USB connector; and an impedance modulating system capacitively coupled to the power line, the impedance modulating system being operative to impose an impedance modulation upon the power line, the impedance modulation corresponding to an identification of the accessory.

Another embodiment is a method for identifying a device comprising: detecting, with a first device, an impedance modulation attributable to a second device; and correlating, by the first device, the impedance modulation with predefined impedance modulations such that an identification of the second device is determined.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
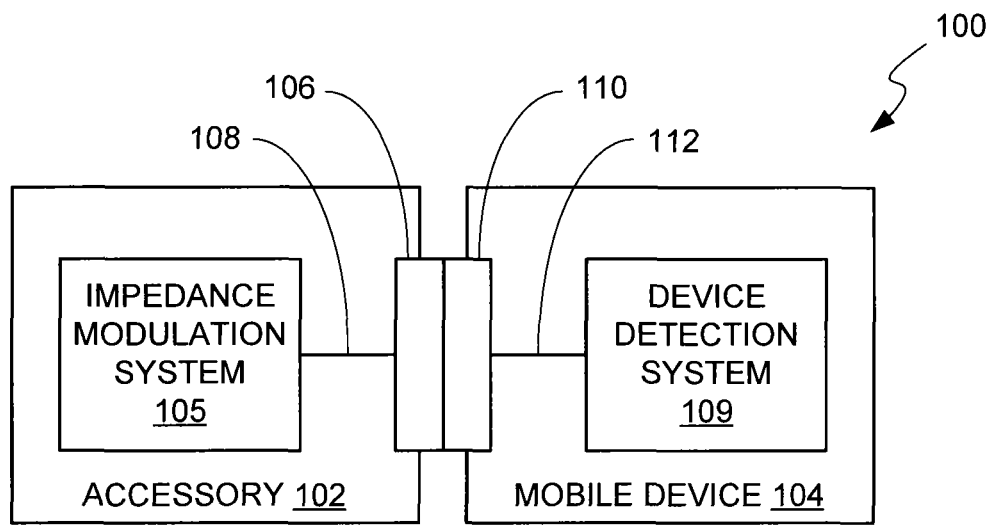
FIG. 1 is a schematic diagram depicting an example embodiment of a system for device identification in which devices are coupled.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Systems, devices and methods involving device identification are provided. In general terms, a frequency domain window is used as a channel for device detection communications. In some embodiments, such a frequency domain window is implemented by a device with a high frequency oscillatory signal that is imposed upon a power line. The power line transmits the signal via an interface to another device (e.g., an accessory) to which the device is coupled. Responsive to the signal, the accessory generates an impedance modulation that can be identified by the device. Notably, the impedance modulation can correspond to information pertaining to the accessory, such as make, model and/or color, among others. In some embodiments, the information about the accessory can be used by the device to alter its manner of operation. By way of example, the device may use the information to alter a background color of a display of the device.

Additionally or alternatively, information communicated to a device using impedance modulation can pertain to a current condition of the accessory. For instance, the accessory can include a sensor for detecting a characteristic of the device, such as temperature or dampness, among others.

Information corresponding to the sensed condition can then be encoded into the impedance modulation.

FIG. 1 is a schematic diagram depicting an example embodiment of a system for device identification. As shown in FIG. 1, system 100 includes a first device 102 and a second device 104. Device 102 incorporates an impedance modulation system 105 that communicates with a connector 106 (e.g., a USB connector) via line 108 (e.g., a power line). Device 104 incorporates a device detection system 109 that communicates with a connector 110 via line 112. The connectors are sized and shaped to mate with each other so that devices 102, 104 electrically communicate with each other. In some embodiments, the lines may be associated with a battery charging subsystem (not shown).

In operation, the impedance modulation system 105 of device 102 imposes a modulated impedance on line 108, which propagates to device 104. The device detection system 109 of device 104 is operative to detect the modulated impedance. Device 104 also is operative to correlate the detected impedance modulation with an identification of device 102.

Figure 2:
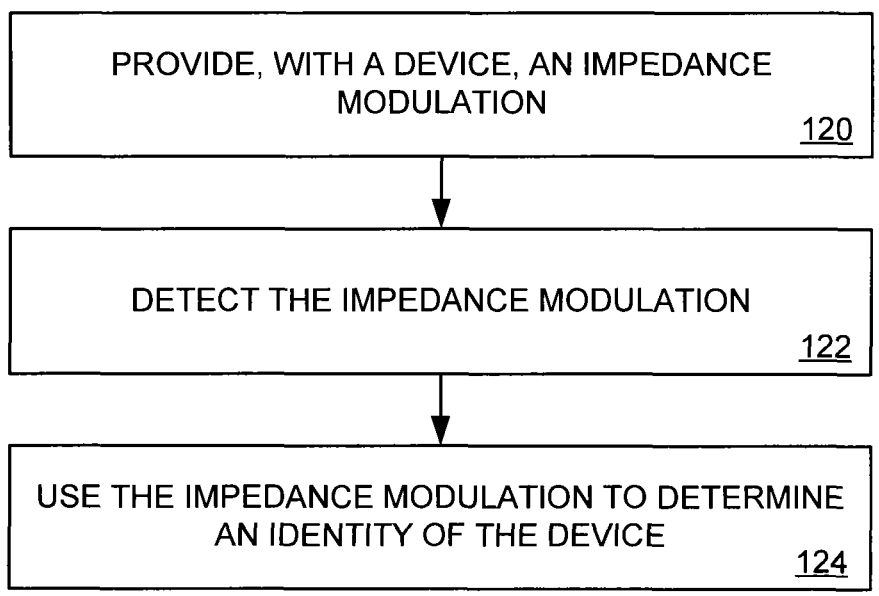
FIG. 2 is a flow chart depicting an example embodiment of a method for device identification.

FIG. 2 is a flow chart depicting an example embodiment of a method for device identification, such as may be performed by the system 100 of FIG. 1. As shown in FIG. 2, the method may be construed as beginning at block 120, in which an impedance modulation is provided. By way of example, such an impedance modulation may be provided by a device (e.g., an accessory) and imposed upon a power signal. In block 122, the impedance modulation is detected such as by another device to which the first device 102 is electrically connected. In some embodiments, the electrical connection between the devices may be for the purpose of battery charging of the device performing the detecting or to provide enhanced functionality. Thereafter, such as depicted in block 124, the impedance modulation is used to identify the device. For instance, the impedance modulation is correlated with predefined impedance modulations so that an identification of the device, which provided the impedance modulations, is determined. In some embodiments, information corresponding to the predefined impedance modulations is stored in memory of the device that is performing the correlations.

Figure 3:
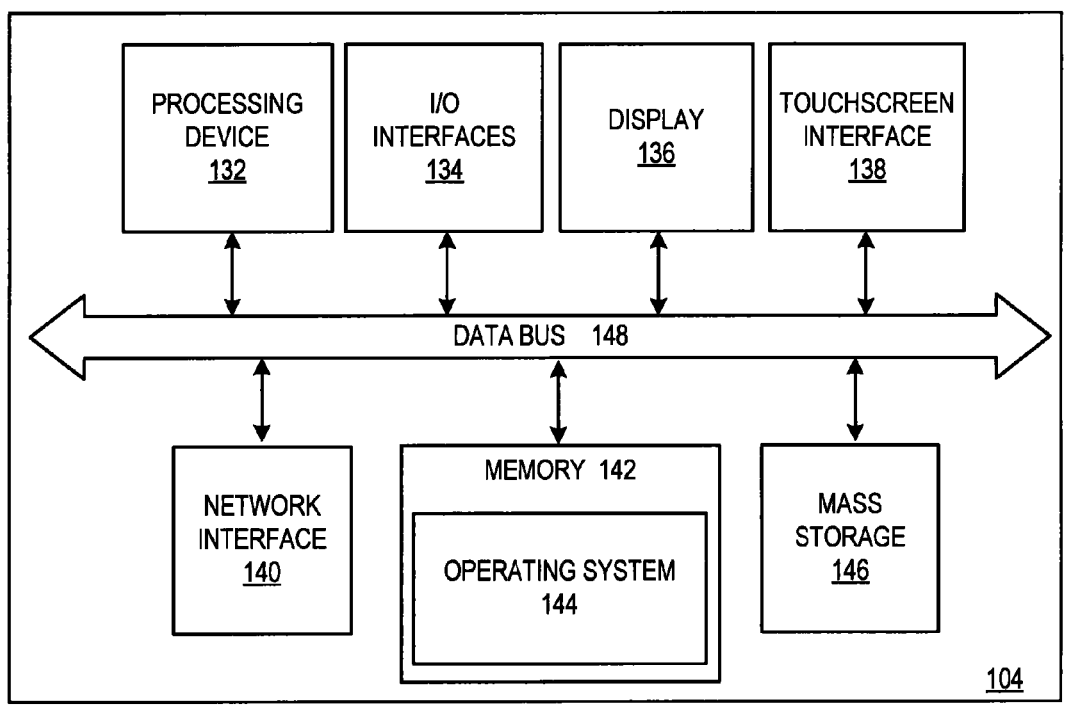
FIG. 3 is a schematic diagram depicting an example embodiment of a device detection system.

FIG. 3 schematically illustrates device 104 shown in FIG. 1 implemented as a smartphone. It should be noted that device 104 is able to perform, among possible others, the functionality associated with blocks 122 and 124 of FIG. 2.

As shown in FIG. 3, device 104 includes a processing device (processor) 132, input/output interfaces 134, a display 136, a touchscreen interface 138, a network interface 140, a memory 142, and operating system 144, and a mass storage 146, with each communicating across a local data bus 148. Note that the local data bus 148 may be comprised of a plurality of buses. Additionally, device 104 incorporates device detection system 109.

The processing device 132 may include any custom made or commercially available processor, a central processing unit (CPU) or an auxiliary processor among several processors associated with the mobile device, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 142 can include any one of a combination of volatile memory elements (e.g., random-access memory (RAM, such as DRAM, and SRAM, etc.)) and nonvolatile memory elements. The memory typically comprises native operating system 144, one or more native applications, emulation systems, or emulated applications for any of a variety of operating systems and/or emulated hardware platforms, emulated operating systems, etc. For example, the applications may include application specific software which may comprise some or all the components of the mobile device. In accordance with such embodiments, the components are stored in memory and executed by the processing device. Note that information associated with predetermined impedance modulations and devices and/or characteristics associated with those impedance modulations may be stored in memory.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

Touchscreen interface 138 is configured to detect contact within the display area of the display and provides such functionality as on-screen buttons, menus, keyboards, etc. that allows users to navigate user interfaces by touch. For some embodiments, the mobile device further comprises an accelerometer configured to detect motion and vibration of the mobile device.

With further reference to FIG. 3, network interface device 140 comprises various components used to transmit and/or receive data over a networked environment. When such components are embodied as an application, the one or more components may be stored on a non-transitory computer-readable medium and executed by the processing device.

If embodied in software, it should be noted that each block depicted in the flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as device 104 shown in FIG. 1. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 4:
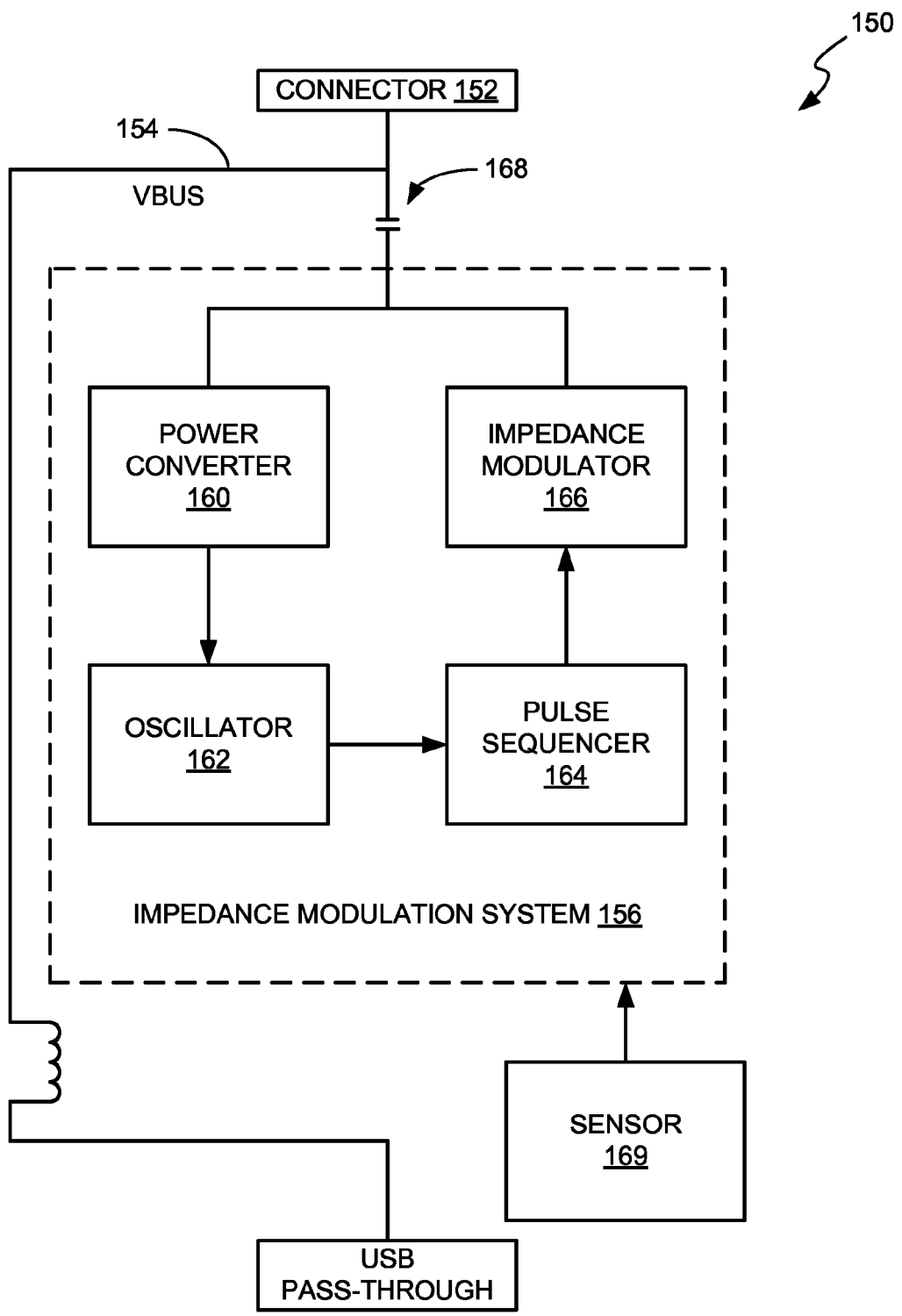
FIG. 4 is a schematic diagram depicting an example embodiment of a device, in this case, an accessory.

FIG. 4 is a schematic diagram depicting an example embodiment of a device that incorporates an impedance modulation system. In this case, device 150 is an accessory that is configured to connect with a mobile device. As shown in FIG. 3, device 150 includes a USB connector 152, a power line 154 electrically connected to the USB connector, and an impedance modulating system 156. The impedance modulation system is capacitively coupled to the power line (e.g., VBUS) and is operative to impose an impedance modulation upon the power line in the frequency domain that is at or near the carrier frequency. In this embodiment, the information encoded into the impedance modulation corresponds to an identification of the accessory.

The impedance modulating system of FIG. 4 incorporates a power converter 160, an oscillator 162, a pulse sequencer 164 and an impedance modulator 166. The power converter rectifies and stores energy, which can be received as high frequency oscillations from a connected device, an example embodiment of which will be described later. Responsive to the received energy, the oscillator 162 generates a modulation frequency. The pulse sequencer 164 generates a repeating data sequence and the impedance modulator (e.g., a transistor) imposes the data in the form of an impedance modifier to the carrier signal. In this embodiment, the capacitive coupling of the impedance modulation system to the power line (via low impedance capacitor 168) enables the impedance modulation to be imposed on the power signal, which is provided for charging a coupled device (e.g., a mobile phone).

In the embodiment of FIG. 4, the modulation frequency is 15 kHz and the repeating sequence is all zeros. Specifically, the impedance modulator 166 is cycled on and off (e.g., by turning on and off the transistor), which presents alternating high and low impedance. In other embodiments, various other modulation frequencies may be used.

Device 150 also incorporates an optional sensor 169 for detecting a characteristic of the device 150. In this embodiment, the sensor 169 is configured to detect an operating temperature of the device, although in other embodiments one or more other characteristics may be sensed. Information corresponding to the sensed characteristic (in this case, temperature) may then be encoded into the impedance modulation. By way of example, responsive to receiving information indicating that the device 150 is operating at a temperature above a predetermine threshold, a device coupled to device 150 and receiving that information may discontinue a battery charging operation being facilitated by device 150.

Figure 5:
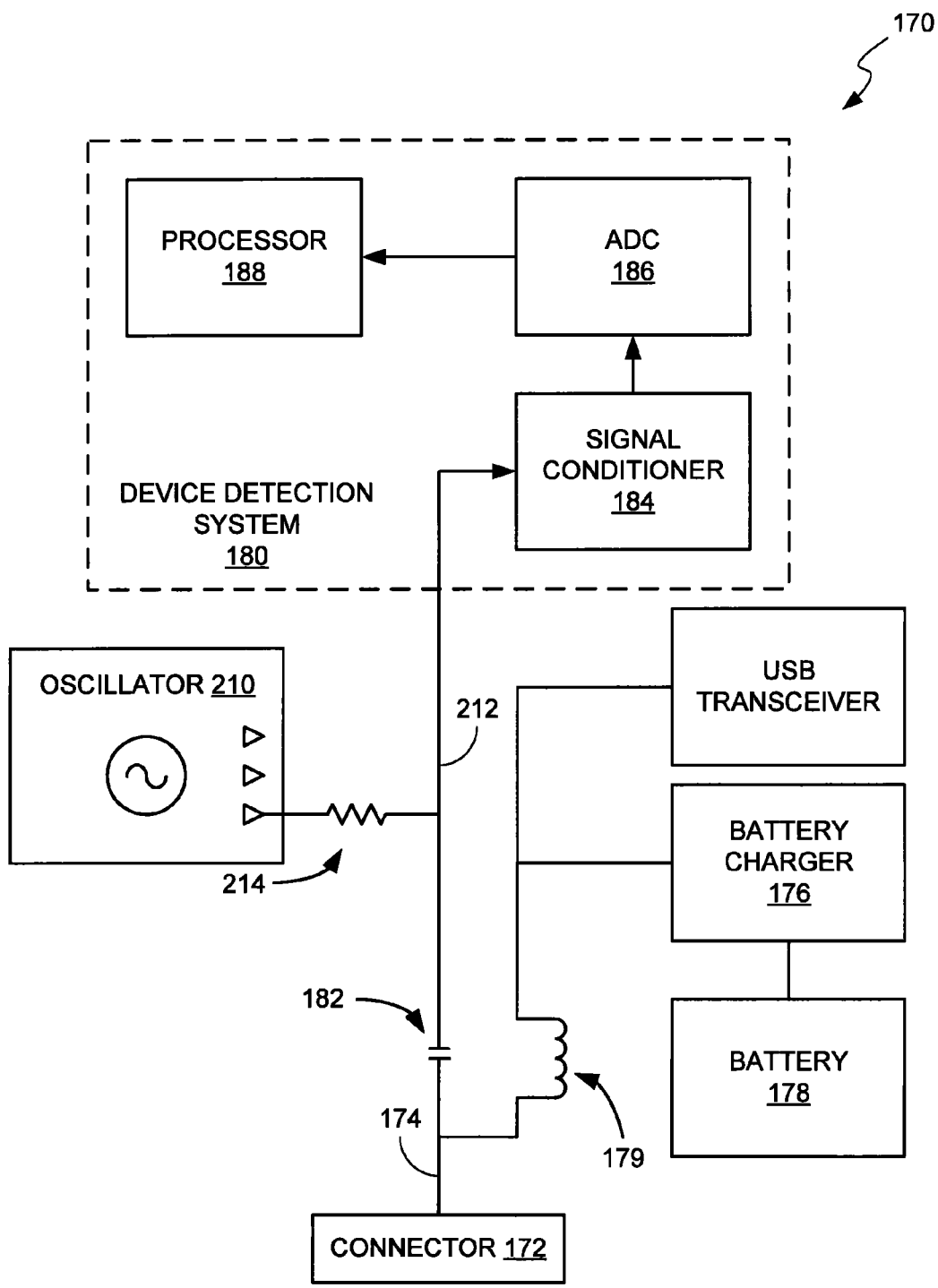
FIG. 5 is a schematic diagram depicting an example embodiment of a device, in this case, a mobile device.

FIG. 5 is a schematic diagram depicting an example embodiment of a device 170 that incorporates a device detection system 180. In this case, device 170 is a mobile device that is configured to connect to another device (e.g., the accessory of FIG. 4). As shown in FIG. 5, mobile device 170 (e.g., a smartphone) includes a connector 172, a power line 174 electrically connected to the connector, and a battery charging circuit 176 electrically connected to the power line. The battery charging circuit is operative to receive electrical power via the power line for charging a battery 178 of the mobile device. Note that the power supply signal for the battery charger is filtered with circuitry (in this case, series inductor 179) to reduce ripple injected into the power supply circuits and to reduce unintended radiation.

Mobile device 170 also includes a device detection system 180 that is capacitively coupled to the power line 174 via capacitor 182. The device detection system 180 senses an impedance modulation imposed upon the power line and correlates the impedance modulation with an identification of a device that is providing the impedance modulations. The device detection system 180 incorporates a signal conditioner 184, an analog-to-digital converter 186 and a processor 188.

In operation, the signal conditioner 184 isolates the impedance modulation from a power signal transmitted by the power line. The analog-to-digital converter (ADC) 186 is electrically coupled to the signal conditioner and receives a conditioned signal from the signal conditioner. Responsive to the conditioned signal, the ADC 186 provides a digital signal corresponding to the impedance modulation to the processor. The processor receives the digital signal and correlates the digital signal with the identification of the device providing the impedance modulations. It should be noted that the data obtained from the ADC 186 is somewhat immune to the effects of battery chargers or other accessories that use the USB because reference level measurements are typically taken prior to the start of impedance modulation. The USB transceiver is shown in the diagram for completeness. The USB transceiver may monitor the USB power line VBUS to determine if it is within allowed tolerance.

Figure 6:
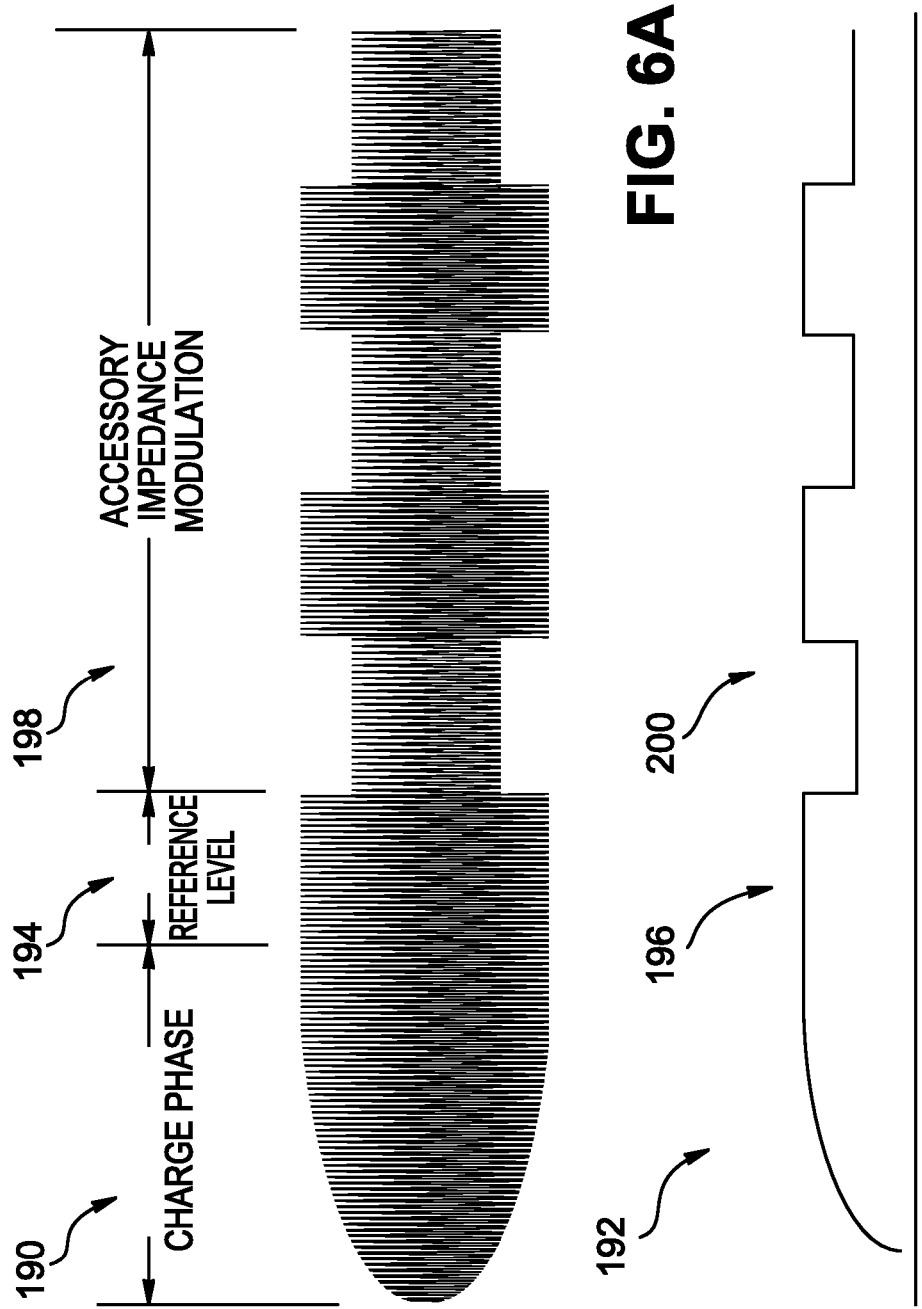
FIG. 6A is a signal diagram depicting a representative input to the device detection system of FIG. 5.
FIG. 6B is a signal diagram depicting a representative input to the analog-to-digital converter of FIG. 5.

FIG. 6A is a signal diagram depicting a representative input to the device detection system of FIG. 5. Notably, the input at the device detection system generally corresponds to the output of the impedance modulation system of the accessory to which the mobile device is connected. FIG. 6B is a signal diagram depicting a representative input to the analog-to-digital converter of FIG. 5.

As shown in FIGS. 6A and 6B, the signals include respective charging phases 190, 192, reference phases 194, 196, and impedance modulating phases 198, 200. Each of the charging phases corresponds to a time during which the impedance modulation system (e.g., the power converter) of the accessory is being charged. In some embodiments, this charging can be accomplished by signal oscillations provided by the mobile device. The reference phases correspond to intervals prior to impedance modulation during which a reference level of impedance is exhibited. The impedance modulating phases correspond to intervals during which modulated impedance is applied to the power line by the accessory. It should be noted that, in some embodiments, the pulse sequencing aspect of the impedance modulations can be selectively altered, such as for communicating state changes of the accessory.

As mentioned above, some devices provide signal oscillations for charging an impedance modulation system of an accessory. By way of example, and with reference again to the embodiment of FIG. 5, mobile device 170 additionally includes an oscillator 210 that is able to provide multiple oscillatory signals for use by the device. For example, such signals may be in the 13 to 48 MHz range. In this embodiment, one of the oscillatory signals (e.g., a 19.2 MHz buffered signal) is coupled to line 212, which is connected to capacitor 182. This oscillatory signal is associated with a known source resistance that may be augmented by a series resistor (e.g., resistor 214). Notably, the source resistance should be of sufficiently high value to allow for amplitude modulation by the time varying changes in accessory impedance, while being of sufficiently low value to allow for power recovery from the carrier signal by the accessory. In this manner, coupling of the oscillatory signal through the connector of the accessory initiates communication between the devices by providing the power for operating the impedance modulation system.

In the above configuration, the process of device identification may be construed as beginning with electrical connection of the device and the accessory, and enabling of the clock buffer. The clock buffer provides isolation of the load variations induced by impedance modulation to other circuits pertaining to the clock signal. The clock buffer also ensures sufficient drive levels to accomplish the functions of the accessory detection system. Some amount of time is provided for the accessory to extract energy from the carrier signal for powering the impedance modulation system. During this time, the ADC 186 determines a reference level for comparison to the yet to be received impedance modulation. Responsive to the modulations being applied, the ADC 186 readings are analyzed to determine the frequency of the modulation and/or the modulation pulse sequence. In this embodiment, the accessory family is defined by the frequency and the detail is defined by the pulse sequence. For instance, the accessory family may be "watchband holder", which is associated with a frequency of 21 kHz, while the accessory detail may resolve to accessory color "blue" and accessory style "sports". Responsive to determining the identification of the accessory, device behavior may be modified to enhance the user's experience with the device. For instance, the user interface mode may be altered. Additionally or alternatively, the sophistication of the modulation may be modified to increase the amount of data, add error correction, reduce unintended radiation, or otherwise enhance the data transmission and reception of the system.

In some embodiments, events other than interaction with a clock buffer may trigger interrogation between interconnected devices. By way of example, charger detection, manual wake from sleep input or other accessory detection interrupts may be used.

Figure 7:
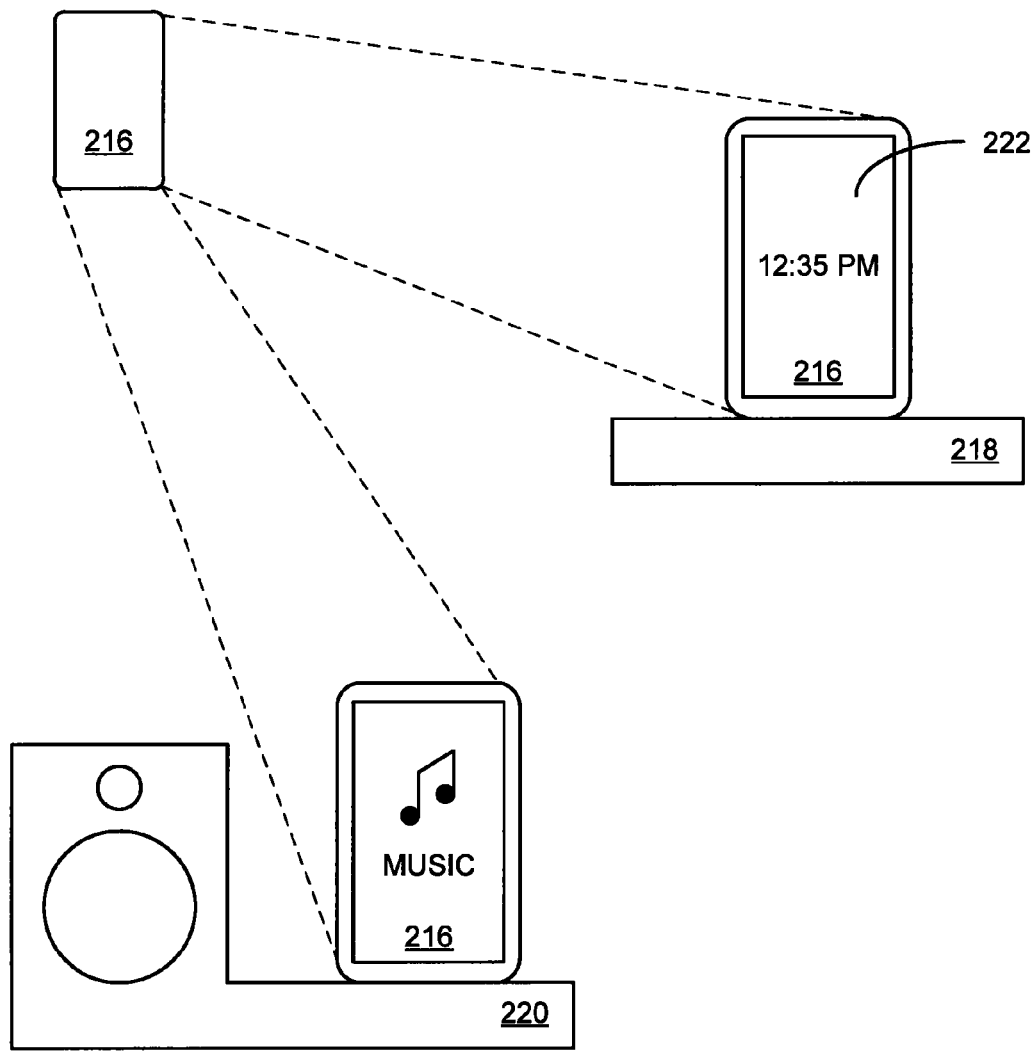
FIG. 7 is a schematic diagram depicting an example embodiment of a device interacting with an accessory.

FIG. 7 is a schematic diagram depicting an example embodiment of a device interacting with multiple accessories. In particular, FIG. 7 depicts a device 216 that is alternately connected to devices 218 and 220. In this embodiment, device 216 is a mobile phone, whereas device 218 is a recharging station and device 220 is an audio speaker accessory.

As shown in FIG. 7, when device 216 is not connected to any of the other devices, the user interface 222 is darkened. However, responsive to connecting device 216 to device 218, the user interface alters modes such that device 216 displays the time of day. Notably, this is performed in response to device 216 identifying device 218 via impedance modulations as being a recharging station that is appropriate for bedroom use, for example. In contrast, responsive to connecting device 216 to device 220, the user interface alters modes such that device 216 displays information associated with music that may be selected for play with the speaker of device 220.

Figure 8:
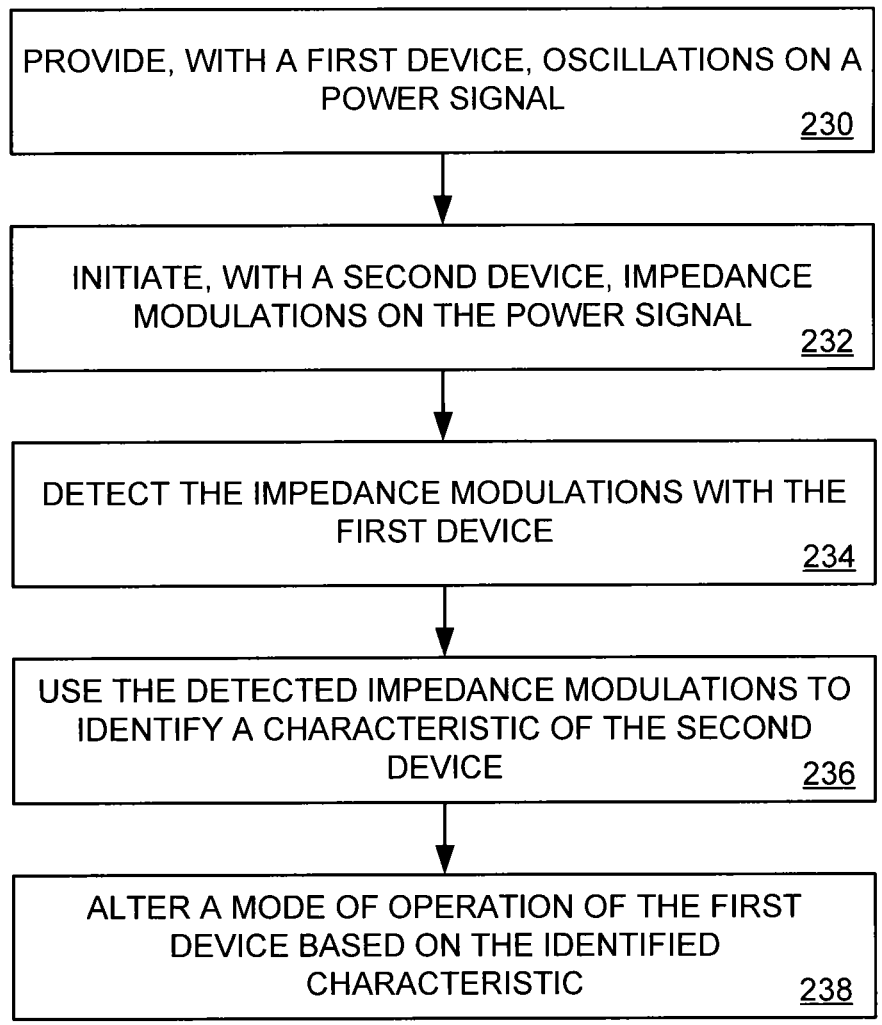
FIG. 8 is a flow chart depicting another example embodiment of a method for device identification.

FIG. 8 is a flow chart depicting another example embodiment of a method for device identification. As shown in FIG. 8, the method may be construed as beginning at block 230, in which a first device provides oscillations on a power signal. In block 232, a second device initiates impedance modulations on the power signal responsive to the oscillations. In block 234, the first device detects the impedance modulations and, in block 236, uses the impedance modulations to identify at least a characteristic of the second device. Thereafter, such as depicted in block 238, a mode of operation of the first device is altered based, at least in part, on the identified characteristic of the second device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for device identification comprising:
an accessory having a first power line and a first connector, the first connector being coupled to the first power line; and
a mobile device having a second power line and a second connector, the second connector being coupled to the second power line and sized and shaped to mate with the first connector such that the accessory electrically communicates with the mobile device;
wherein the accessory is operative to modulate impedance exhibited at the first power line in response to communication initiated by the mobile device, the mobile device being operative to initiate the communication with the accessory by providing oscillations to the accessory via a signal path established by coupling of the first connector and the second connector, the oscillations from the mobile device providing power to the accessory to modulate the impedance exhibited at the first power line;
the mobile device having a signal conditioner electrically communicating with the second power line and being operative to isolate the modulated impedance from the oscillations such that the mobile device is operative to detect the modulated impedance and correlate the modulated impedance with an identification of the accessory;
the mobile device being operative to selectively alter a mode of operation of the mobile device based, at least in part, on the identification of the accessory correlated from the detected modulated impedance;
the accessory having a temperature sensor and being operative to alter the modulated impedance to encode information corresponding to a sensed temperature onto the modulated impedance and communicate the information to the mobile device; and
the mobile device being operative to selectively alter the mode of operation of the mobile device based, at least in part, on the information encoded onto the altered modulated impedance.

2. The system of claim 1, wherein:
the first device has a first oscillator and the second device has a second oscillator;
the second oscillator is electrically coupled to the second power line and operative to impose the oscillations on the second power line;
the first device is operative to respond to oscillations on the first power line corresponding to the oscillations imposed on the second power line.

3. The system of claim 2, wherein the first device further comprises an impedance modulator capacitively coupled to the first power line, the impedance modulator being powered, at least in part, by electrical charge attributable to the oscillations imposed on the second power line and propagated to the first device.

4. The system of claim 2, wherein:
the first oscillator is capacitively coupled to the first power line; and
the second oscillator is capacitively coupled to the second power line.

5. The system of claim 1, wherein the mobile device is a mobile phone.

6. The system of claim 1, wherein:
the second device further comprises a battery charging circuit electrically coupled to the second power line; and
the first device is operative to charge the second device by providing power to the battery charging circuit.

7. The system of claim 1, wherein the first connector is a USB connector and the second connector is a USB connector.

8. A method for device identification comprising:
coupling a first connector of a first device with a second connector of a second device to form a signal path therebetween;
initiating communication between the first device and the second device by propagating oscillations along the signal path from the first device to the second device, wherein the second device applies an impedance modulation to the signal path in response to the oscillations;

detecting, with the first device, the impedance modulation attributable to the second device by isolating the impedance modulations from the oscillations;

correlating, by the first device, the impedance modulation with predefined impedance modulations such that an identification of the second device is determined;

selectively altering a mode of operation of the first device based, at least in part, on the identification of the second device;

altering, by the second device, the modulated impedance to communicate a sensed temperature condition of the second device to the first device such that the sensed temperature condition is encoded into the modulated impedance altered by the second device; and selectively altering the mode of operation of the first device based, at least in part, on the modulated impedance altered by the second device.

9. The method of claim 8, wherein the impedance modulation is imposed on a power signal.

10. The method of claim 9, further comprising using the power signal to charge the first device.

11. The system of claim 8, wherein:

the accessory is operative to charge the mobile device; and the mobile device is configured to discontinue charging by the accessory based, at least in part, on the altered modulated impedance.

* * * * *